United States Patent [19]

Zamuner

[11] Patent Number: 5,313,046
[45] Date of Patent: May 17, 1994

[54] WELDING TORCH

[76] Inventor: Frank Zamuner, 1110 Dundas Street West, Oakville, Ontario, Canada, L6J 4Z2

[21] Appl. No.: 952,261

[22] Filed: Sep. 28, 1992

[51] Int. Cl.[5] .............................................. B23K 9/173
[52] U.S. Cl. ................................................. 219/137.62
[58] Field of Search ...................... 219/137.62, 137.31, 219/137.61

[56] References Cited

U.S. PATENT DOCUMENTS

| | | | |
|---|---|---|---|
| 2,510,205 | 6/1950 | Baird | 219/137.62 |
| 2,777,928 | 1/1957 | Bernard | 219/137.62 |
| 3,018,360 | 1/1962 | Engel . | |
| 3,047,714 | 7/1962 | Wepfer . | |
| 3,398,231 | 8/1968 | Sullivan . | |
| 3,529,126 | 9/1970 | Reeh | 219/137.62 |
| 3,803,381 | 4/1974 | Bernard . | |
| 4,109,131 | 8/1978 | Schluter . | |
| 4,309,590 | 1/1982 | Stol . | |
| 4,313,046 | 1/1982 | Henry . | |
| 4,346,279 | 8/1982 | Lessmann et al. . | |
| 4,393,298 | 7/1983 | Frantzreb . | |
| 4,464,560 | 8/1984 | Church et al. . | |
| 4,916,283 | 4/1990 | Nagasaka . | |

FOREIGN PATENT DOCUMENTS 2116100 9/1983 United Kingdom .

*Primary Examiner*—Clifford C. Shaw
*Attorney, Agent, or Firm*—Anthony Asquith & Co.

[57] ABSTRACT

The water-cooled welding torch has a water jacket which places the water in direct contact with the nose-piece of the torch, which guides the welding wire into the arc. The nose-piece contains gas-spreader-holes, which receive the argon etc. from a gas feed tube and convey the gas out of and around the nose-piece. The exit-mouths of the gas-spreader-holes lie further forward (i.e. nearer the arc) than the entry-mouths thereof, and the forward end of the water jacket also lies forward of the entry-mouths.

3 Claims, 3 Drawing Sheets

WELDING TORCH

This invention relates to welding torches, of the kind usually referred to as water-cooled welding torches.

BACKGROUND OF THE INVENTION

The kind of welding torch to which the invention relates is coupled to a number of services, including: a means for conveying electrical energy to the welding tip, and for producing an arc; a means for advancing welding rod progressively into the arc; and a means for supplying shielding gas, such as carbon dioxide or argon; to the arc, which serves to prevent oxidation at the arc.

The welding torch may be a component of an automatically guided welding head, or the torch may be designed to be held in the hand, in which case usually the torch including an operable switch means for controlling the welding rod advancer and the electricity supply to the arc. The welding torch may or may not also be coupled to a fume hood and vacuum extraction system.

One of the problems of welding torches is to keep the torch cool, and water-cooled welding torches are currently in widespread use. The manner in which the cooling jacket is arranged on the torch in the conventional designs however, in many cases has proved unsatisfactory.

It is recognised that the water jacket should be as close to the arc as possible, since the excessive heat comes of course from the arc. The more of the torch in the torch that is allowed to become hot, the more troublesome the cooling problem.

One particular problem that arises when the torch is allowed to overheat lies in the electrical insulation material present in the torch. This is generally of plastic material, for example Teflon (trademark), which can deteriorate if overheated. The water cooling jacket therefore should be close enough to the arc that the jacket prevents excessive heat being transmitted to the insulation.

It is recognised that the water jacket must not be allowed to leak. If droplets of water find their way into the weld, the strength of the weld can be seriously impaired.

Thus, the water jacket should extend in the axial sense as far forward as possible in the torch, towards the arc. It is recognised also that the water jacket should be close-in, radially, to the components surrounding the welding wire near the arc.

It is the general practice in torch design to run the wire through a nose-piece, which serves to guide and locate the welding wire immediately prior to the wire entering the arc. Apart from the wire itself, this nose-piece is the component of the torch that lies closest to the arc, and it is recognised that the water in the water jacket should directly touch the material of the nose-piece, if cooling is to be most effective. Most torches include a shroud for directing the gas over the arc; in cooling the torch, it is of little use, for example, to place the water jacket outside this shroud. Some previous designs of water cooled torch in fact have placed the water jacket outside the shroud, or outside the insulation; effectively useless as such measures are, they illustrates the extent to which it is desired to keep the torch cool.

The anti-oxidation or other weld-protecting or weld-enhancing gas approaches the nose-piece via a gas feed tube, and then spreads out around and over the nose-piece. The nose-piece is formed with gas-spreading-holes for thus conducting the gas. The design of the water jacket must take into account the fact that the exit-mouths, through which the gas emerges around the nose-piece, of course cannot be allowed to be compromised by the presence of the water jacket.

The invention is concerned with a design of the nose-piece in which all these varying requirements are accounted for an co-ordinated, and yet in which the nose-piece is cooled effectively.

GENERAL FEATURES OF THE INVENTION

The invention provides a water-cooled welding torch. The gas-spreading-holes in the nose-piece of the torch have entry-mouths, into and through which the gas flows from the feed-tube into the gas-spreading-holes in the nose-piece, and exit-mouths, from the through which the gas emerges from the nose-piece.

The gas-spreading-holes in the nose-piece are so folded and arranged that the exit-mouths thereof lie further forward in the nose-piece than the entry-mouths thereof.

The torch includes a jacket-piece, which lies outside and around the nose-piece, and which is radially spaced from the nose-piece, whereby a water jacket is defined between the nose-piece and an outer surface of the jacket-piece, the arrangement of which is such that water present in the water jacket is in direct contact with the material of the nose-piece.

The jacket-piece is sealingly attached to the nose-piece, in such a manner as to define a sealed forward end of the water jacket, and the arrangement of the torch is such that the said forward end of the water jacket lies further forward than the entry-mouths of the gas-spreading-holes, and the exit-mouths of the gas-spreading-holes lie further forward than the forward end of the water jacket.

By this structural arrangement of the torch, the forward extremity of the water jacket can lie very close to the forward end of the nose-piece, that is to say, the water jacket lies as close as possible to the arc, in a position where its presence can be most effective.

Preferably, the jacket-piece encircles the nose-piece, and is formed from a separate piece of material from the nose-piece. Preferably, the jacket-piece is brazed to the nose-piece. Preferably, the brazed joint therebetween defines the forward end of the water jacket.

Preferably, the gas-spreading-holes are defined in part by drillings formed in the material of the nose-piece, and some of the drillings are aligned axially or almost axially in and with respect to the nose-piece; the nose-piece includes a central passageway, which is in direct gas-receiving communication with the gas-feed-tube; and preferably the entry-mouths of the gas-spreader-holes are formed from a groove cut radially outwardly into the material of the nose-piece from the central passageway.

BRIEF DESCRIPTION OF THE DRAWINGS

By way of further explanation of the invention, exemplary embodiments of the invention will now be described with reference to the accompanying drawings, in which.

Figure 1:
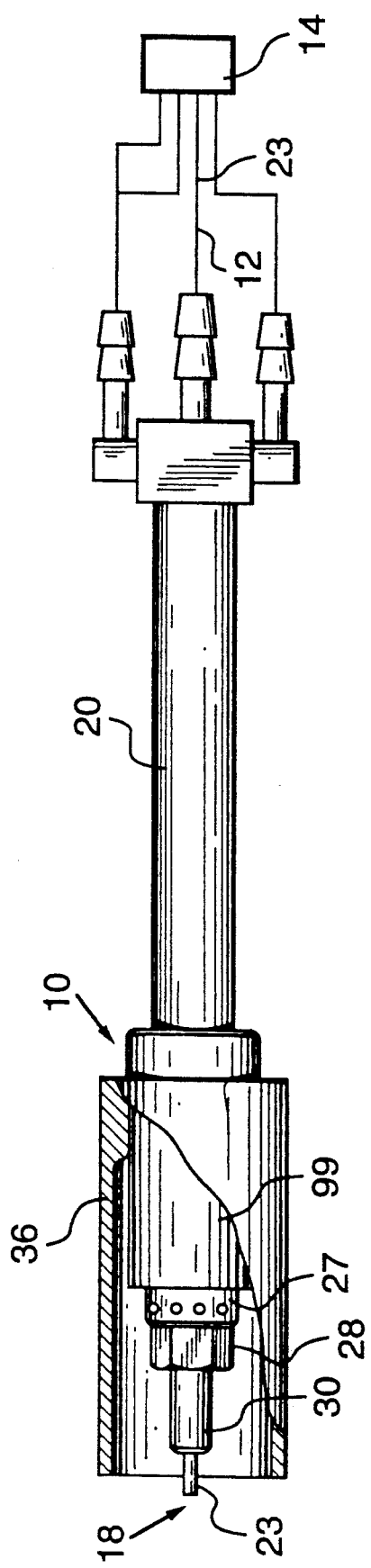
FIG. 1 is a plan of a water-cooled welding torch which embodies the invention (such a welding torch is often bent to a goose-neck configuration, but is here shown straightened)

The items shown in the accompanying drawings and described below are examples which embody the invention. It should be noted that the scope of the invention is defined by the accompanying claims, and not necessarily by specific features of exemplary embodiments.

DETAILED DESCRIPTION OF PREFERRED EMBODIMENT

The torch 10 includes a gas entry 12, which is supplied with an inert gas such as argon, or carbon dioxide, or another anti-oxidation gas, or other weld-protection or weld-enhancing gas, from a service station 14. The gas is conveyed from the entry 12 through a conduit 16 to the arc-zone 18. The conduit 16 includes a number of stages and phases, as will be explained.

The conduit 16 includes a gas feed-tube 20. Welding wire 23 passes down centre of the feed-tube 20. In the feed-tube 20, the gas surrounds the wire 23, the wire being not tightly confined by the walls 25 of the feed-tube, but on the contrary being very loose therein, whereby there is ample room, in the feed-tube 20, for both the wire 23 and for the gas. The gas is contained within the (cylindrical) wall 25 of the feed-tube 20.

Like the gas, the welding-wire 23 also is supplied from the service station 14. The wire 23 is driven forwards by a motor in the service station, in the conventional manner.

Approaching the arc-zone 18, the wire 23 enters a nose-piece 29. The nose-piece 29 is of chunky robust form, and is made of brass. The nose-piece 29 as shown in FIG. 1, includes a nose-piece-body 27, a tip-holder 28, and a replaceable tip 30.

The nose-piece 29, which includes the tip-holder 29 and the replaceable tip 30, has a central narrow passage or wire-way 32. The wire 23 passes through the wire-way 32 in the nose-piece, but the wire-way is too tight on the wire to convey the gas flow. For adequate flow volumes, the gas needs a passageway that is much wider than the small clearance between the wire 23 and the wire-way 32. The designer must see to it that the clearance between the welding wire and the wire-way is tight enough to physically support and locate the welding wire, but loose enough not to interfere with the free movement of the wire through the passage, and this requirement means that the gas cannot be conveyed through the wire-way.

In fact, the wire-way 32 should not be too tight a fit on the wire 23; the wire 23 becomes very hot, and expands and may jam on the wire way if the fit is too tight. In the present case, where the wire-way is formed in a component which is being efficiently cooled, it is especially required that the fit be not too tight.

However, even though the fit is not quite tight, the required flow rate of gas cannot pass through the wire-way 32 in the nose-piece 29; therefore, the gas instead has to flow around the outside of the nose-piece 29.

Thus, in passing through the torch 10, the gas travels first along the feed-tube 12; then the gas encounters the nose-piece 29, and has to flow around the outside of the nose-piece. Therefore, the designer of the torch has to provide a means for receiving the gas from the feed-tube 12, and a means for conveying the gas outwards, and around the nose-piece 29. In assessing the nature of this requirement, is should be noted that the designer also has to make sure the nose-piece 29 is physically attached to the (metal) wall 25 of the feed-tube 20, since the structure of which the feed-tube is a component is the same structure that mechanically supports the nose-piece.

The wall 25 of the feed-tube 20 is physically attached, and attached in a robust and rigidly supportive manner, to the nose-piece 29. It is contemplated that the feed-tube may be formed in the same piece of metal as the nose-piece, or the feed-tube may be made integral with the nose-piece by being brazed or soldered thereto, or both may be brazed or soldered to an intermediate-piece, if such is provided. In the design shown in FIG. 2, an intermediate-piece 34 is brazed to the wall 25 of the feed-tube 20, and the nose-piece 29 is brazed to the intermediate-piece.

The conventional manner in which the gas is conveyed outwards from the feed-tube 12 is by providing gas-spreading-holes in the nose-piece. A sleeve-shaped shroud is provided, which fits around the nose-piece, and which creates an annular chamber around the outside of the nose-piece. The gas emerging from the gas-spreading-holes is received into this annular chamber, and conveyed finally to the arc-zone 18.

Figure 2:
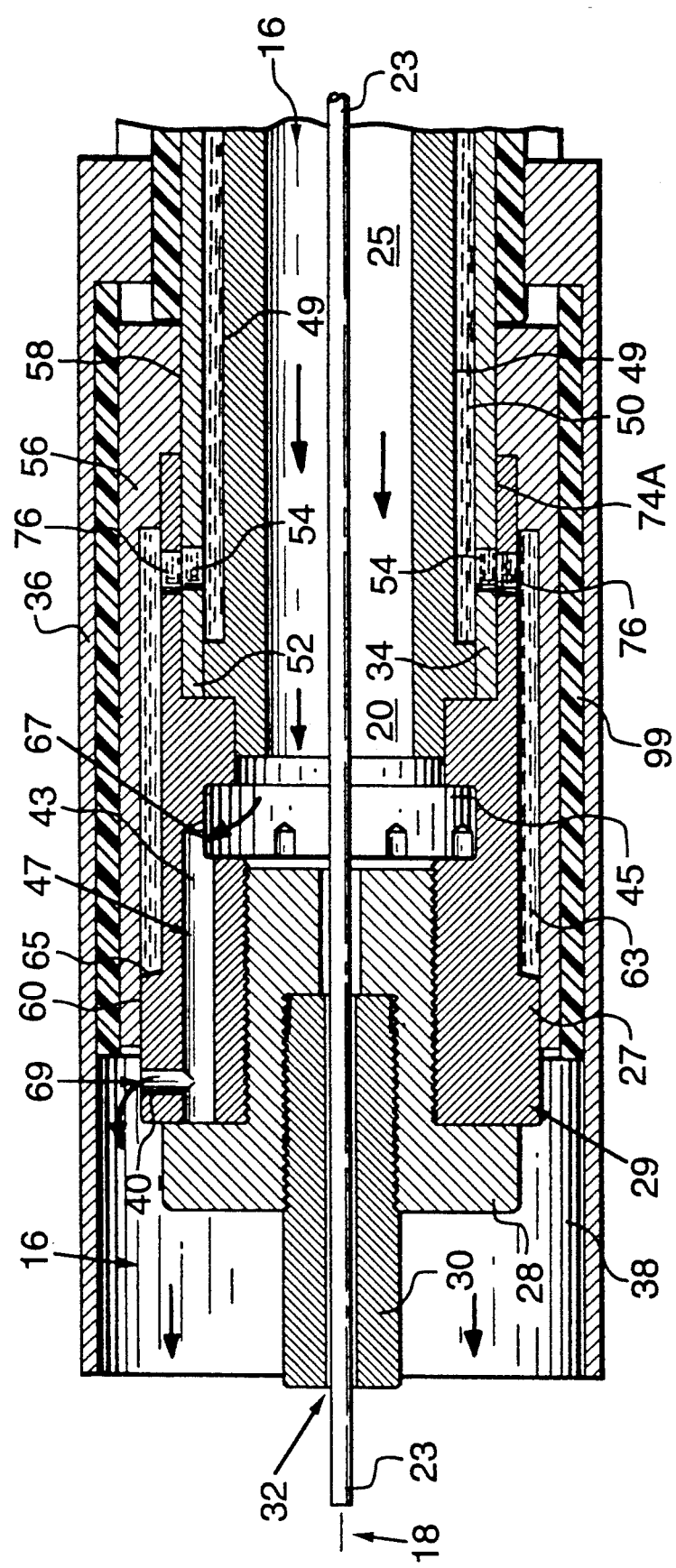
FIG. 2 is a sectioned close-up view of a forward portion of the torch of FIG. 1.

In the design shown in FIG. 2, the sleeve-shaped shroud 36 has dimensions such that the gas is volumetrically confined only a little when in the annular chamber 38 between the nose-piece 29 and the cover 36, with the result that the gas has little forwards velocity when it enters the arc-zone 18. If the gas were "jetted" into the arc-zone, the weld might be spoiled; rather, the torch-designer's intention is to gently smother the arc-zone with the gas.

One of the features of the present invention lies in the manner of arranging the gas-spreading-holes through which the gas is diverted around the outside of the nose-piece. The nose-piece 29 of FIG. 1 is provided with a series of radially-drilled holes 40, a series of axially-drilled holes 43, and a machined groove 45. Suitable jigs are used when carrying out the drillings to ensure the radial holes 40 communicate with the axial holes 43, and that the axial holes 43 all open out into the groove 45. The gas-spreading-holes 47 thus comprise the aggregate of the radial holes 40, the axial holes 43, and the groove 45. It will be understood that gas is conveyed from the feed-tube 20 to the chamber 38 outside of the nose-piece 29 through the gas-spreading holes 47.

The manner in which the torch is water-cooled will now be described.

The intermediate 34 is tubular, and is dimensioned to fit over the outside of the feed-tube 20. The walls 25 of the feed tube are partially machined away, whereby two diametrally-opposed flats 49 are produced thereon. When the intermediate-piece is slipped over the feed-tube 20, two passages 50 are formed, running along the axial length thereof. Cooling water from the service station 14 is fed into one of the water passages 50, and is returned along the other water passage.

The forward end of the feed-tube 20 is not machined with the flats 49, but is formed with a cylindrical land 52. The intermediate-piece 34 is brazed to the feed-tube 20 at this land 52. The land 52 is axially long enough to ensure the brazed joint is physically robust and rigid, and of course also watertight.

The intermediate-piece 34 is provided with holes 54 drilled radially through the tubular wall of the piece 34. The holes 54 are orientated to align with the flats 49, whereby water in the water passages 50 can pass out through the appropriate one of the holes 54, and back in through the other one of the holes 54.

A jacket-piece 56 is brazed over the outside of the intermediate-piece 34. The brazed-land 58 again is large enough (ie axially long enough) to ensure good robustness and watertightness.

The forward end of the jacket-piece 56 is brazed around the body 27 of the nose-piece 29. Once again the brazed land 60 should be of a good length.

An annular water jacket 63 is formed around the nose-piece, ie between the nose-piece and the jacket-piece 56. Water circulates circumferentially from one of the holes 54 to the other, and in doing so sweeps through the whole extent of the jacket 63. In a particular case, if the water should tend to flow straight from one hole 54 to the other, without adequately sweeping the whole water jacket, suitable shaped flow directors can be inserted into the water jacket. However, such flow directors are not normally needed.

By means of the arrangement as shown of the gas-spreading-holes 47, the forward end 65 of the water jacket 63 is enabled to overlie the nose-piece 29. Because the water jacket extends so far forwards, the water in the water jacket is able to cool the metal of the nose-piece directly and effectively.

As explained above, the gas flows along the gas feed tube 20 until it encounters the forward end of the gas feed tube, whereupon the gas enters the gas-spreading-holes 47. The gas-spreading-holes 47 convey the gas for the feed-tube 20 to the annular chamber 38. The gas enters the gas-spreading-holes 47 at the entry-mouths 67 thereof, where the gas leaves the feed tube 20. The gas emerges from the exit-mouths 69 of the gas-spreading-holes 47, where the gas emerges into the chamber 38.

In the gas-spreading-holes 47 in the nose-piece, the exit-mouths 69 of the gas-spreading-holes are further forward than the entry-mouths 67. The forward end 65 of the water jacket 63 lies between the entry and exit-mouths; that is to say, the forward end 65 of the water jacket lies forward of the entry-mouths 67, and rearwards of the exit-mouths 69. The gas-spreading-holes 47 are arranged to lie partially along the axial length of the nose-piece, whereby the exit-mouths lie further forward than the entry-mouths.

The forward end 65 of the water jacket 63 must lie rearwards of the exit-mouths 69, and also must lie rearwards of the brazing land 60. Given these constraints, it is the axial folding of the gas-spreading-holes 47 which allows the forward end 65 to be so far forward.

Figure 3:
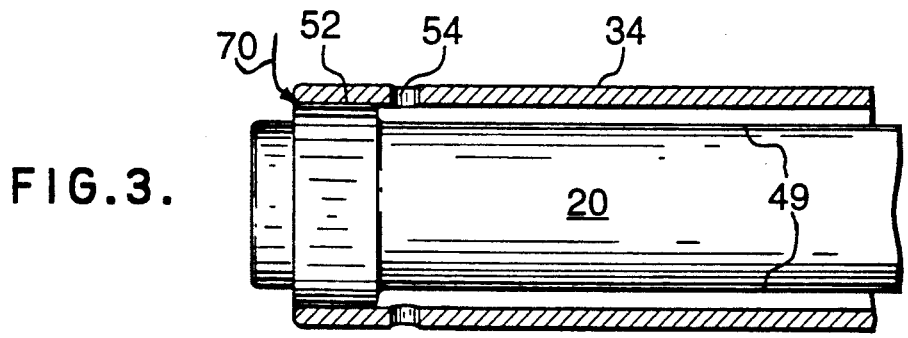
FIG. 3 shows some of the components of the torch of FIG. 1 at a stage in the manufacture thereof.
Figure 4:
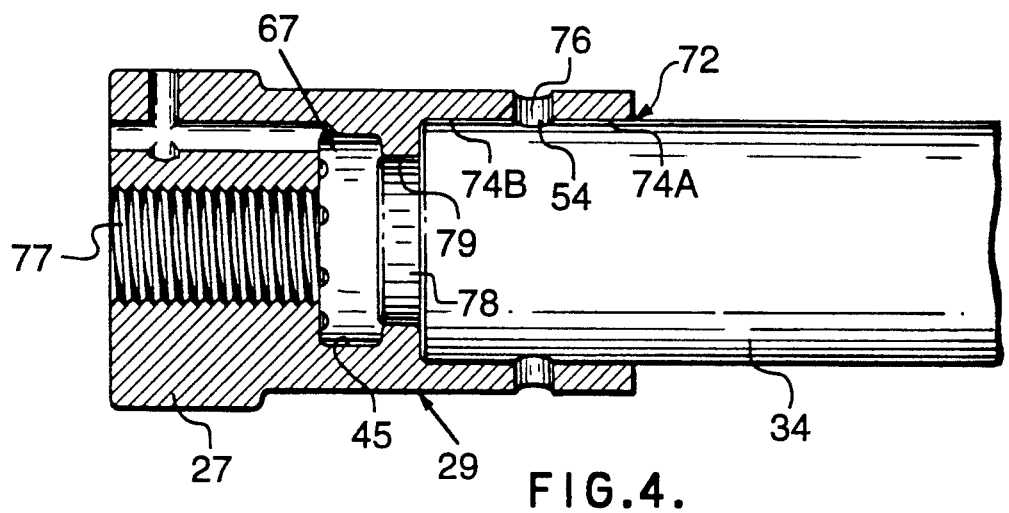
FIG. 4 shows some more of the components of the torch of FIG. 1 during manufacture.

For ease of manufacture of the torch 10, the brazing lands 52, 58, 60 should be not only long, but also readily accessible for the application of brazing heat, and of brazing filler. First, as shown in FIG. 3, the intermediate-piece 34 is brazed to the feed-tube 20. There is ample accessibility for application of the brazing filler into the land 52, as shown by the arrow 70.

The brazed sub-assembly of the intermediate-piece 34 and the feed tube 20 is next brazed into the body 27 of the nose-piece 29. Now, there is good access, as shown by the arrow 72, to the land 74A, but the access is not so easy for the forward end, 74B, of the land. The problem lies in the hole 54 in the intermediate-piece, and in the corresponding hole 76 in the nose-piece. It is difficult to arrange for the braze filler to penetrate evenly all around the circumferences of the junction between the holes.

The designer therefore wishes to provide brazing-access to the area 74B of the land that lies forward of the holes 54. This cannot be done directly, because of the shapes of the components but, instead, it is recognised that brazing-access may be provided through the (threaded) central hole 77 of the nose-piece body, to a spigot 78 on the feed-tube, and to the land 79 between the spigot 78 and the nose-piece.

The designer must see to it that no water can leak out of the water jacket 63 and into the flow of gas. Water droplets in the gas flow, even very small droplets, would seriously damage the weld. The land 74B, being inaccessible from the direction of the arrow 72, might not be so securely brazed; however, the braze at land 74B is backed up by the brazed land 79, which is braze-accessible from inside the nose-piece. By this means, the torch can be given adequate security against leakage of water into the gas flow.

It will be noted that there is no difficulty of braze-access when it comes to brazing the jacket-piece 56 to the intermediate-piece 34 and to the nose-piece 29.

The groove 45 is important in providing access for brazing the land 79, and for providing the entry-mouths 67 for the gas to enter the axial portions 43 of the gas-spreading-holes 47.

Figure 5:
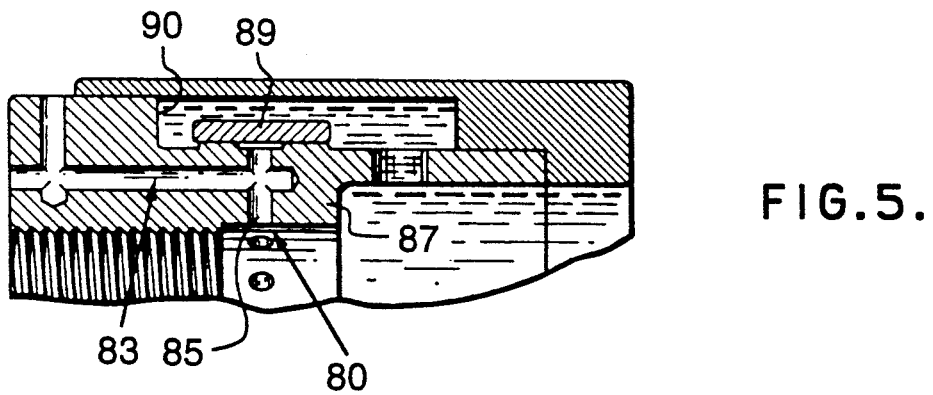
FIG. 5 is a view corresponding to FIG. 2 of another torch which embodies the invention.

FIG. 5 shows a non-preferred manner of arranging the gas-spreading-holes. Here, the entry-mouths 80 of the gas-spreading-holes 83 are provided by making drillings 85 right through the cylindrical wall thickness of the nose-piece 87. The gas is prevented from emerging from these radially-directed drillings 85 by brazing on a cover 89, which encircles the nose-piece 87, and covers the ends of the drillings 85. Such a cover 89, however, creates more potential leakpaths to which attention must be given, as compared with the FIG. 2 design where the gas-spreading-holes 47 are simply machined into solid metal, and require no sealed covers. The FIG. 5 design does however show the forward end 90 of the water jacket extending further forwards than the entry-mouths 80 of the gas-spreader-holes.

Figure 6:
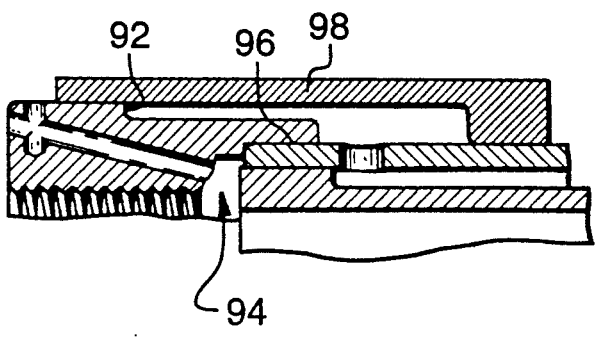
FIG. 6 is a view corresponding to FIG. 2 of yet another torch which embodies the invention.

FIG. 6 shows another alternative design in which again the forward end 92 of the water jacket lies further forward than the entry-mouths 94 of the gas-spreader-holes. Here, it will be noted that the brazed land 96 has good access, because at the time the braze is carried out the jacket-piece 96 is not present.

As will be observed, in the design as shown the water jacket extends further forward over the nose-piece than the entry-mouths of the gas-spreader-holes. This is because the gas-spreader-holes are folded or fanned forwards, enabling the metal radially outside the entry-mouths to be solid and unbroken, whereby the water can be allowed to contact outside of that metal. The gas does not emerge from the nose-piece until much further forward, leaving room for a brazed joint between the forward extremity of the water jacket and exit-mouths of gas-spreader-holes.

The welding rod 23 is electrified, and the feed tube, the nose-piece, the intermediate-piece, the jacket-piece, and the water, are all at the electrified voltage also. The external shroud is grounded, and the structure of the torch includes suitable plastic (Teflon) insulators, as shown at 99.

As mentioned, it is important that the gas does not "jet" onto the weld-arc. The tip-holder 28 is screw-threaded into the body 27 of the nose-piece 29, and, when the tip-holder is screwed in, the head of the tip-holder serves to blank off the axially-drilled holes 43, thus forcing the gas out through the radially-drilled holes 40. If jetting of the gas would not be a problem in a particular case, the head of the tip-holder can be smaller, and the gas can be allowed to emerge forwardly, or partially forwardly.

In the torch of FIG. 2, the tip-holder 28 is separate from the replaceable tip 30. The tip 30 has to be replaced on a fairly regular basis, and is made as simple, and as inexpensive, as possible. The tip-holder 28 also must be replaced occasionally, due to the build-up splashes from the arc zone.

Figure 7:
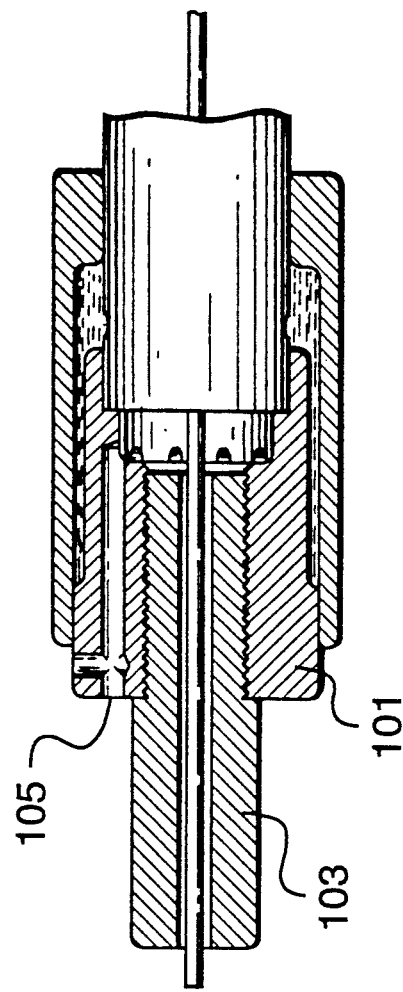
FIG. 7 is a view corresponding to FIG. 2 of still another torch which embodies the invention.

FIG. 7 shows a nose-piece-body 101 similar to that of the previous figures, but in FIG. 7 the replaceable tip that screws into the body is in one piece, 103. This type of one-piece tip may especially be used in cases where the tip can be slim diametrally; that is to say, in cases where the gases can be allowed to blow directly forwards, ie out of the axial mouths 105 of the gas holes, and onto the arc zone. As mentioned, some kinds of welds can, to an extent, tolerate the gas being blown directly onto the arc zone.

It may be noted that wire-way should not be provided in the nose-piece-body itself. It is the fact that the wire way is especially vulnerable to damage that causes the tip to have to be replaceable. The nose-piece-body is an integral part of the torch, being brazed in, and therefore cannot be the replaceable item.

I claim:

1. Water-cooled welding torch, wherein:
   the torch includes an electrified welding-wire, suitable for creating a welding arc;
   the torch includes a gas-feed-tube, for conveying anti-oxidation gas to the welding arc;
   the torch includes a nose-piece, which is located forward, towards the arc, of the gas-feed-tube;
   the nose-piece is formed with gas-spreading-holes, which are suitably positioned in the nose-piece for receiving gas in and from the gas-feed-tube, and for conveying the gas radially outwards and around the nose-piece;
   the gas-spreading-holes have entry-mouths, into and through which the gas flows from the feed-tube into the gas-spreading-holes in the nose-piece;
   the gas-spreading-holes have exit-mouths, from and through which the gas emerges from the nose-piece;
   the gas-spreading-holes in the nose-piece are so folded and arranged that the exit-mouths thereof lie further forward in the nose-piece than the entry-mouths thereof;
   the nose-piece includes a central wire-way, through which the welding wire passes, the wire-way in the nose-piece being of such narrow dimensions as to preclude the flow of the gas through the wire-way;
   the torch includes a jacket-piece, which lies outside and around the nose-piece;
   the jacket-piece is radially spaced from the nose-piece, whereby a water jacket is defined between the nose-piece and an outer surface of the jacket-piece, the arrangement of which is such that water present in the water jacket is in direct contact with the material of the nose-piece;
   the torch includes means for conducting cooling water into and out of the water jacket;
   the jacket-piece is sealingly attached to the nose-piece, in such a manner as to define a sealed forward end of the water jacket;
   and the arrangement of the torch is such that the said forward end of the water jacket lies further forward than the entry-mouths of the gas-spreading-holes, and the exit-mouths of the gas-spreading-holes lie further forward than the forward end of the water jacket.

2. Torch of claim 1, wherein:
   the jacket-piece encircles the nose-piece, and is formed from a separate piece of material from the nose-piece;
   the torch includes means for sealingly attaching the jacket-piece to the nose-piece;
   and the said means comprises a brazed joint between the jacket-piece and the nose-piece.

3. Torch of claim 1, wherein the gas-spreading-holes are defined in part by drillings formed in the material nose-piece;
   some of the drillings are aligned axially or almost axially in and with respect to the nose-piece;
   the nose-piece includes a central passageway, which is in direct gas-receiving communication with the feed tube;
   the entry-mouths of the gas-spreader-holes are formed from a groove formed radially outwardly into the material of the nose-piece from the central passageway.

* * * * *